United States Patent
Andersson et al.

(10) Patent No.: US 9,731,351 B2
(45) Date of Patent: Aug. 15, 2017

(54) HYBRIDE PART AND METHOD OF MANUFACTURE

(71) Applicant: SIEMENS AKTIENGESELLSCHAFT, München (DE)

(72) Inventors: Olov Andersson, Norrkoping (SE); Jonas Eriksson, Finspong (SE); Andreas Graichen, Norrköping (SE)

(73) Assignee: SIEMENS AKTIENGESELLSCHAFT (DE)

( * ) Notice: Subject to any disclaimer, the term of this patent is extended or adjusted under 35 U.S.C. 154(b) by 217 days.

(21) Appl. No.: 14/431,834

(22) PCT Filed: Jul. 25, 2013

(86) PCT No.: PCT/EP2013/065696
§ 371 (c)(1),
(2) Date: Mar. 27, 2015

(87) PCT Pub. No.: WO2014/048607
PCT Pub. Date: Apr. 3, 2014

(65) Prior Publication Data
US 2015/0266092 A1    Sep. 24, 2015

(30) Foreign Application Priority Data

Sep. 28, 2012    (EP) .................................... 12186580

(51) Int. Cl.
*B22F 3/105* (2006.01)
*B33Y 30/00* (2015.01)
(Continued)

(52) U.S. Cl.
CPC ............ *B22F 3/1055* (2013.01); *B22F 5/009* (2013.01); *B22F 5/10* (2013.01); *B22F 7/06* (2013.01);
(Continued)

(58) Field of Classification Search
CPC ..... Y10T 428/24744; Y10T 428/24322; B22F 3/1055; B22F 5/009; B22F 7/062; B33Y 10/00; B33Y 80/00; B29C 67/0051
See application file for complete search history.

(56) References Cited

U.S. PATENT DOCUMENTS 4,848,722 A * 7/1989 Webster .................... F16K 7/17
137/613
5,203,368 A * 4/1993 Barstow .................... B01J 4/02
137/240

(Continued)

FOREIGN PATENT DOCUMENTS

| DE | 44 00 315 C1 | 1/1995 |
|---|---|---|
| EP | 1 295 846 | 3/2003 |
| EP | 1 295 846 A1 | 3/2003 |

OTHER PUBLICATIONS

Extended European Search Reported issued in European Application No. 12186580 dated Feb. 25, 2013.

(Continued)

*Primary Examiner* — Donald J Loney
(74) *Attorney, Agent, or Firm* — Ostrolenk Faber LLP

(57) ABSTRACT

A part (P) includes a first (FP), and a second portion (SP), which meet at an interface (IF). A channel (CH) extends from the first portion (FP) through the interface (IF) into the second portion (SP). Further there is a method to generate the part (P). To refurbish a part with tiny geometry channels, the second portion (SP) is produced by additive manufacturing technology on the interface (IF) with the first portion (FP), the channel (CH) has a first average diameter (DI) in the first portion (FP) and the interface (IF), and the channel (CH) has a second average diameter (D2) in the second portion (SP) at said interface (IF). The second diameter (D2) is larger than the first diameter (DI). The channel (CH) has (Continued)

a first tapered portion (TP) which narrows in the second portion (SP) at increasing distance from the interface (IF).

5 Claims, 1 Drawing Sheet

(51) Int. Cl.
    *B29C 67/00*         (2017.01)
    *B22F 5/10*          (2006.01)
    *B22F 7/06*          (2006.01)
    *B22F 5/00*          (2006.01)
    *B33Y 10/00*        (2015.01)
    *B33Y 80/00*        (2015.01)

(52) U.S. Cl.
    CPC .......... *B22F 7/062* (2013.01); *B29C 67/0051* (2013.01); *B33Y 30/00* (2014.12); *B22F 2007/068* (2013.01); *B33Y 10/00* (2014.12); *B33Y 80/00* (2014.12); *Y02P 10/295* (2015.11); *Y10T 428/24322* (2015.01); *Y10T 428/24744* (2015.01)

(56) References Cited

U.S. PATENT DOCUMENTS

| | | | | |
|---|---|---|---|---|
| 6,293,012 | B1 * | 9/2001 | Moles | ............... B01L 3/502707 |
| | | | | 29/890.124 |
| 7,041,057 | B1 * | 5/2006 | Faupel | ................. A61B 5/1486 |
| | | | | 600/345 |
| 8,007,704 | B2 * | 8/2011 | Smith | ............... B29C 45/14811 |
| | | | | 264/272.11 |
| 2007/0275210 | A1 | 11/2007 | Heselhaus | ..................... 428/116 |

OTHER PUBLICATIONS

International Search Report and Written Opinion issued in PCT/EP2013/065696 dated Nov. 8, 2013.
International Search Report dated Nov. 8, 2013 issued in corresponding International Patent Application No. PCT/EP2013/065696.
International Preliminary Report on Patentability dated Dec. 11, 2014 issued in correpsonding International Patent Application No. PCT/EP2013/065696.

* cited by examiner

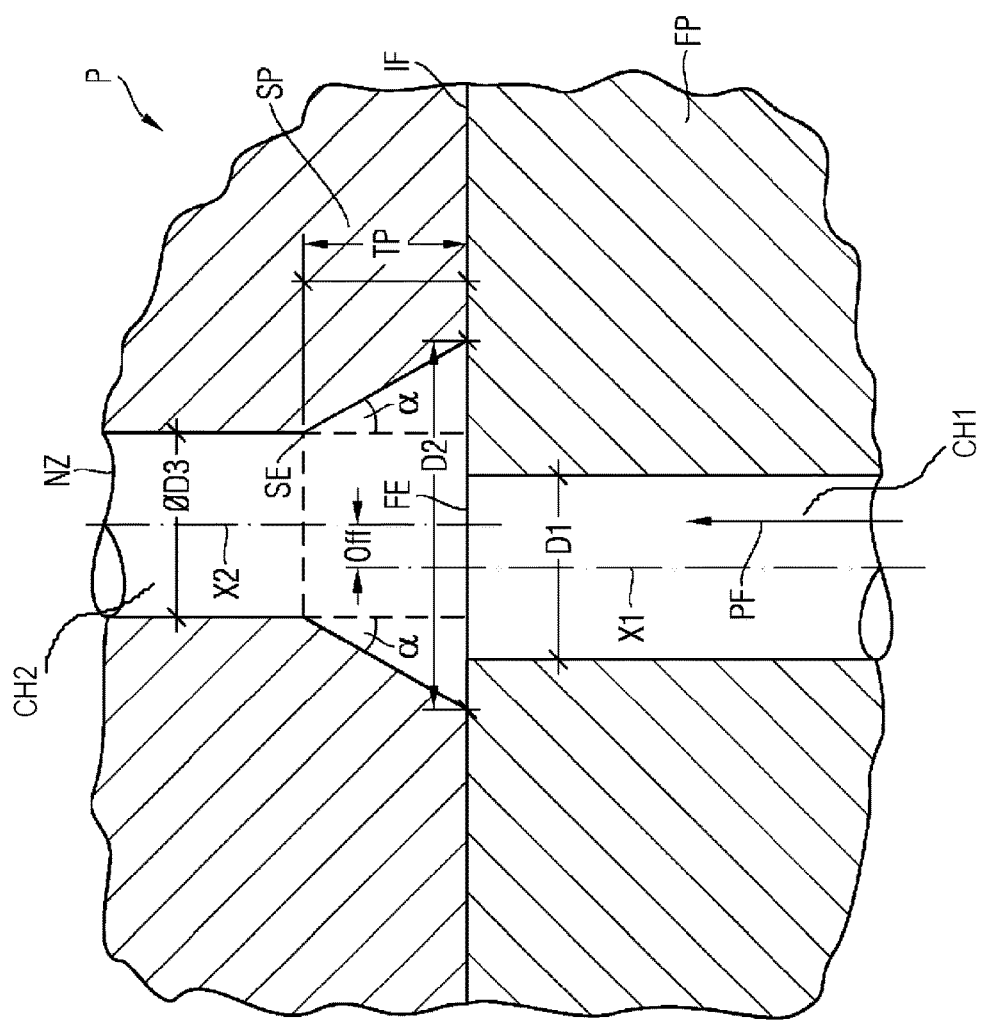

US 9,731,351 B2

HYBRIDE PART AND METHOD OF MANUFACTURE

CROSS-REFERENCE TO RELATED APPLICATIONS

The present application is a 35 U.S.C. §§371 national phase conversion of PCT/EP2013/065696, filed Jul. 25, 2013, which claims priority of European Patent Application No. 12186580.2, filed Sep. 28, 2012, the contents of which are incorporated by reference herein. The PCT International Application was published in the English language.

TECHNICAL FIELD

The invention relates to a hybride part comprising a first portion and a second portion, wherein an interface defines said first portion from said second portion and a channel extends from said first portion through said interface into said second portion.

The expression "hybride part" is here defined as a part comprising a first portion and a second portion meeting each other at an interface defining the first portion from the second portion. The parts may be fixed homogenously together, both connected parts may also be seen as a hybride part made of one piece.

Further the invention relates to a method to manufacture said hybride part.

TECHNICAL BACKGROUND

Additive manufacturing or 3D printing is a process of making three dimensional solid objects with a high degree of freedom of the design according to a 3D virtual module. Basically the object is created by providing layers of material to a substrate or a platform whereby the final object can have a layered material structure. The object can be made by additive manufacturing in total without being one piece of material with the substrate.

Today several additive technologies are known, for example selective laser sintering, direct metal laser sintering, fused deposition modeling, stereo lithography, digital light processing, fused filament fabrication, melted and extrusion modeling, laminated object manufacturing, electron beam melting, selective heat sintering or powder bed and ink head 3D printing.

From DE 44 00 315 CI it is known to lithographically add layers of material to a part to build a micro-structure. A high degree of accuracy is needed to avoid any significant offset in channels extending from a substrate into the added material.

From US 2007/0275210 A1 it is known to layerwise generate a honeycomb seal.

From EP 1295846 a multilayered microdevice structure comprising channels is known.

This invention concentrates on additive technologies which enables the generated composite part to be used in a gas turbine burner. The most interesting technologies are therefore selective laser sintering, direct metal laser sintering or fused deposition modeling. Since these additive technologies are comparatively young developments, design adjustments have not been performed so far to optimally exploit the advantages of these technologies as is done for conventionally produced parts. Conventional production here means mature technology for example casting, milling or turning.

Especially advantageous is additive manufacturing in the field of service and refurbishment for example of burner heads of gas turbines. If a burner head of a gas turbine made to inject fuel and maybe oxygen containing gas into a combustion chamber is worn out by for example erosion, it is conventionally completely replaced. By using additive manufacturing a part of this burner head can be cut off and the remaining part can be used as a substrate for additive manufacturing, for example selective laser melting.

Here it is, however, very difficult to adjust the position of the used part accurately to guarantee that tiny channels in the first existing part are placed correctly to be continued by the second part to be generated by the additive manufacturing onto the substrate. Normally the aim is to exactly continue these channels extending through the old piece of material into the new piece of material across the interface between these two parts without any position shift restricting the average diameter of said channel at the interface. It is therefore up to now not an interesting option to rework such parts as described above since an offset can merely be avoided.

SUMMARY OF THE INVENTION

It is one object of the invention to improve the design of a hybride part of the incipiently mentioned type such that refurbishment by additive manufacturing can be done without significant quality restriction in the resulting part. It is another object of the invention to provide a method of performing additive manufacturing on an existing first portion of the incipiently mentioned type resulting in a final hybride part without significant quality restriction.

The invention solves the above objects by a hybride part of the incipiently defined type with additional properties disclosed herein. Further the invention proposes a method according to the claims to overcome the above problems.

It is essential that the hybride part produced from the first portion and the second portion finally be of one piece of material.

The first portion can be made by any production method, for example conventionally machining as milling, turning or casting. Channels in the first portion can also be provided by any manufacturing method, for example by drilling or electro dynamic machining. The first portion can be produced also by additive manufacturing.

The second portion is formed or provided by additive manufacturing as defined above. The first portion serves as a substrate for the second portion in the area of the interface where the second portion is added onto the first portion. The invention overcomes the problem that arises because every manufacturing process is limited in accuracy and especially in the process of refurbishing a part during the above described cutting and adding material method. Conventional additive manufacturing adds up inaccuracies to a magnitude which is not particularly tolerable, including tiny geometries like a channel continuously extending through the first portion, the interface and the second portion. Considering the tiny size of these channels, it is possible that channels of the two portions would be offset or would not even meet, causing a discontinuity in a channel due to the limits of accuracy of the respective production methods.

The invention makes the above defined production processes more capable of dealing with tiny geometries without expending extensive effort to increase accuracy. The invention makes the design itself more tolerable of inaccurate manufacturing and thereby saves time and costs. Further, the invention now simply enables some designs to be formed as a hybride part as defined above, which designs were, due to accuracy problems, not possible before.

One preferred embodiment of a hybride part provides a channel having a first section at the interface between the first and second portions and a second section at a specific distance remote from the first portion, wherein an average third diameter of the channel at the second section is nominally the same as the first diameter of the first portion. This design feature enables the best approximation of the channel geometry generated by additive manufacturing to a part which may be made of one piece and by one single manufacturing process. If the channel ends in the second portion into a nozzle remote from the interface, this nozzle will nearly not be influenced by any offset of the channel in the area of the interface with regard to fluid dynamic properties of the channel. Preferably, the cross-section of the channel is shaped round but it can be of any geometry.

The average diameter referred to in this document is the diameter of a circle surrounding an area identical to a cross section of the channel.

The preferred application of the invention is in a method to refurbish a part by first machining away or cutting off a portion to be replaced, and replacing it by the second portion disclosed herein.

According to the invention this method of rework is preferably applied to gas turbine parts, especially to gas turbine burner parts.

The above mentioned attributes and other features and advantages of this invention and a manner of attaining them will become more apparent and the invention itself will be better understood by reference to the following description of a currently best mode of carrying out the invention taken in conjunction with the accompanying drawings, wherein

BRIEF DESCRIPTION OF THE DRAWING

The FIGURE shows a schematic depicting a hybride part according to the invention made by a method according to the invention.

DESCRIPTION OF AN EMBODIMENT

The FIGURE shows a schematic depiction of a hybride part P according to the invention comprising a first portion FP and a second portion SP which meet each other at an interface IF defining said first portion FP from the second portion SP. A channel CH1 extends from the first portion FP through the interface IF into the second portion SP. The channel CH1 in the first portion FP extends along a central first axis X1, and in the second portion SP, the channel CH2 extends along a second axis X2. The first axis X1 and the second axis X2 are nominally meant to be identical. But, in an actual hybride part, those axes are offset from each other by an offset OFF due to manufacturing or alignment inaccuracies. The second portion SP is built up on the interface IF with the first portion FP by additive manufacturing. In this example, the SP was built up by laser sintering.

The channel CH1 in the first portion FP has a first diameter D1, especially in the area of the interface IF. The channel CH2 in the second portion SP in the area of the interface IF has a second diameter D2, which is larger than D1. At an increasing distance away from the interface IF, the channel CH2 in the second portion SP is tapered along a first tapered portion TP until that channel's diameter has a third diameter D3. The third diameter D3 here is identical with the first diameter D1. Diameter here means that the design has a nominal identical average diameter, which can deviate according to manufacturing accuracy. In this example, the tapering is conical with a conus-angle of $\alpha$. However the tapering can have any geometry including a "tulip" shape aimed to reduce turbulence if the channel CH conducts a process fluid PF especially in the direction from the first portion FP to the second portion SP. Preferably, the channel port FP to the second portion SP with reduced pressure loss. Preferably, the channel CH2 extends all the way through the second part SP, such that the channel CH2 might join into a nozzle NZ.

According to the method of the invention to manufacture the hybride part P, in a first step, the first portion FP is provided and the channel CH1 extends along a first central axis XI through the first portion FP.

In a second step, material is added by additive manufacturing to the interface IF to build up the second portion SP. The channel CH2 in the second portion SP is provided with the above described geometry.

Preferably, the offset OFF between the first axis X1 and the second axis X2 is less than (D2−D1), and preferably is (D2−D1)/2.

The invention claimed is:

1. A hybride part comprising:
   a first portion;
   a second portion positioned at said first portion;
   an interface defining said first portion from said second portion;
   wherein said second portion is produced by additive manufacturing technology and is produced on said first portion and at said interface;
   a channel extending from said first portion through said interface and into said second portion;
   said channel has a first average diameter in said first portion and at said interface;
   said channel has a second average diameter in said second portion and at said interface; said second average diameter being larger than said first average diameter;
   wherein said channel tapers narrower along a first tapered section of said channel in said second portion wherein said first tapered section tapers narrower at increasing distance from said interface;
   wherein said channel extends along a first central axis in said first portion at least in proximity to said interface;
   wherein said channel also extends along a second central axis in said second portion at least in proximity to said interface;
   wherein said first axis is parallel to and offset from said second axis at and near said interface; and
   wherein an end of said channel in said first portion at said interface and a first end of said first tapered section of said channel in said second portion at said interface are at a same level, one side of said end of channel in said first portion is within a portion of said first end of said channel in said second portion, said portion being within a third average diameter of a second section of said channel in said second portion, said second section ending at a second end of said first tapered section, and another side of said end of said channel in said first portion is outside of said portion of said first end of said first tapered section of said channel in said second portion.

2. The hybride part according to claim 1, wherein said third average diameter of said second section of said channel in said second portion is nominally the same as said first average diameter.

3. The hybride part according to claim 1, wherein said second section has a round, oval, or elliptic cross section.

4. A method to produce the hybride part according to claim 1, the method comprising:
providing said first portion for said hybride part;
forming said second portion for said hybride part by adding material by additive manufacturing to said first portion and thereby also forming said interface between said first and said second portions in order to build up said second portion, and said interface defining said first portion from said second portion;
providing said channel extending from said first portion, through said interface and into said second portion;
providing said first portion, in which said channel extends through said first portion along said first central axis at least in proximity to said interface;
wherein said channel has said first average diameter in said first portion at said interface;
adding material to build up said second portion at said interface and causing said channel to extend along said second central axis at least in proximity to said interface;
said channel has said second average diameter in said second portion at said interface;
wherein said second average diameter is larger than said first average diameter; and
wherein said channel in said second portion tapers along said first tapered section which becomes narrower in said second portion at increasing distance from said interface.

5. The method according to claim 4, wherein said second central axis of said second portion is offset from said first central axis over said interface, and said offset is smaller than the diameter of said channel in said second portion at said interface minus the diameter of said channel in said first portion at said interface.

* * * * *